Sept. 15, 1936.   T. C. DELAVAL-CROW   2,054,582
BEARING AND SEAL
Filed Oct. 1, 1934

INVENTOR:
THOMAS C. DELAVAL-CROW,
BY
HIS ATTORNEY.

Patented Sept. 15, 1936

2,054,582

UNITED STATES PATENT OFFICE 2,054,582

BEARING AND SEAL

Thomas C. Delaval-Crow, Bristol, Conn., assignor to General Motors Corporation, Detroit, Mich., a corporation of Delaware Application October 1, 1934, Serial No. 746,405

15 Claims. (Cl. 308—187.2)

This invention relates to bearings and seals therefor and comprises all of the features of novelty herein disclosed. An object of the invention is to provide improved sealing means to close the space between the race rings of an antifriction bearing. Another object is to provide improved means for sealing a bearing in a bearing seat. To these ends and also to improve generally upon devices of this character, the invention consists in the various matters hereinafter described and claimed. In its broader aspects, the invention is not necessarily limited to the specific constructions selected for illustrative purposes in the accompanying drawing in which—

One source of trouble in rear axles of motor cars is the leakage of lubricant from the differential casing to the brakes, the leakage tendency being augmented by the movement of the vehicle around curves, thus tending to throw the lubricant past the bearing. The inner race ring can be press fitted tightly to the shaft but the outer race ring of a unit handling bearing is a sliding fit in the housing so that it and the axle shaft can be inserted together into the housing. Such sliding fit is not close enough to preclude leakage along the outside of the bearing. According to the present invention, the outer race ring is sealed in its seat by a simple device which also may form a portion of the means which seals the space between the bearing rings.

Figure 1:
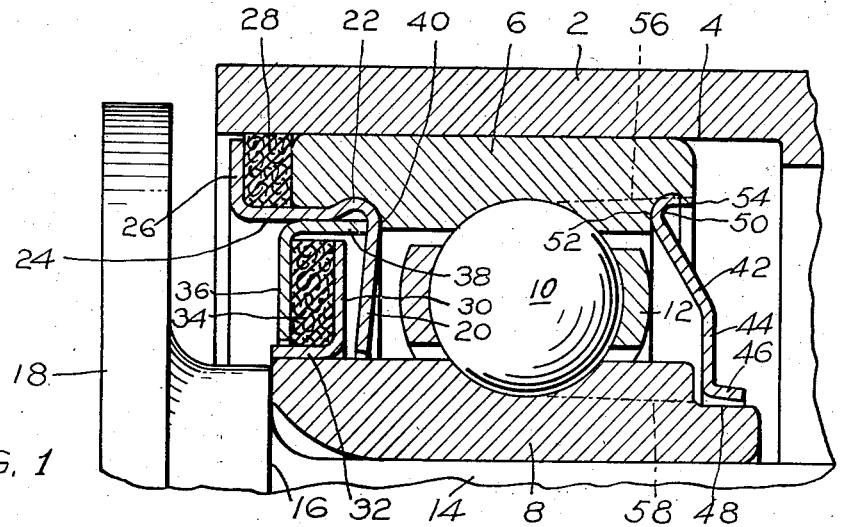
Fig. 1 is an axial section to large scale of a portion of a ball bearing and its mounting.

In Fig. 1, the numeral 2 indicates a casing, such as an axle housing having a cylindrical seat 4 for a bearing having an outer race ring 6, an inner race ring 8, and rolling elements 10 in a cage 12. A shaft 14, which is indicated as the drive shaft or rear axle of a motor car, provides a seat and an abutment shoulder 16 for the inner race ring of the bearing. The axle also has a flange 18 which has suitable connections with a wheel (not shown). The closure for the outer end of the bearing comprises a series of washers. One of them has an inclined flange or wall 20 nearly meeting the inner race ring, a rounded bead 22 fitting in a groove of the outer race ring, an axial wall 24 extending beyond the end of the race ring, and a terminal flange 26 extending outwardly in spaced relation to the end of the race ring to form a groove for a compressible packing ring 28. The latter engages the inner surface of the axle housing and obstructs leakage of lubricant while also resisting rotation of the outer race ring. The rounded bead 22 is secured in the groove by rolling or expanding the metal outwardly by a suitable tool.

The flange 20 forms part of the seal for closing the space between the race rings and is inclined at an angle of about four degrees with respect to a vertical leg 30 of an angle washer whose other leg 32 is pressed on the inner race ring. The relatively inclined walls provide a capillary space which tends to retain bearing lubricant between the race rings. A packing washer 34 fits in the angle of the angle washer and its outer side face engages a flat flange or leg 36 of a second angle washer having also a cylindrical flange or leg 38 which is pressed inside the axial wall 24 until its edge meets the wall 20 in opposition to a shoulder 40 at one side of the groove in the race ring.

Bearing lubricant is retained at the other side of the bearing by a dished shield or guard having a flaring wall 42, a vertical wall 44, and a laterally extending terminal flange 46 which is inclined at about four degrees to the adjacent surface of a peripheral notch 48 of the inner race ring. The outer periphery of the shield has a curved portion 50 which rests against a shoulder 52 bounding a groove in the race ring, the edge of the shield being rolled in behind a lip or land 54. Filling slots 56 and 58, which are indicated by the broken lines, are optional, and provide means for inserting some of the balls in their race grooves, these slots being closed by the ends of the shield so that gear lubricant is kept away from the bearing lubricant.

Figure 2:
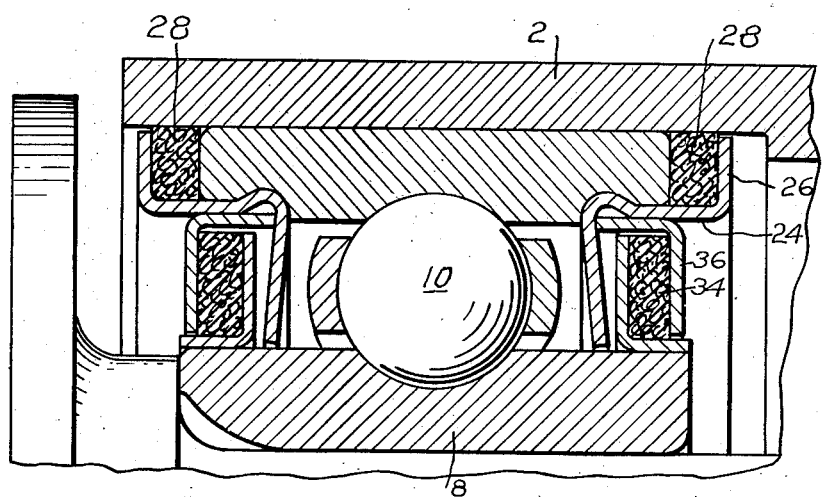
Fig. 2 is a similar view of a modified form.

In Fig. 2, the bearing and seals provide a substantially symmetrical structure, the sealing means being alike at both ends of the bearing. The packing 28 at the right however provides an additional obstruction to leakage of lubricant from the axle housing while also preventing such lubricant from reaching the outer surface of the bearing and so making it likely to creep unduly in its seat.

Figure 3:
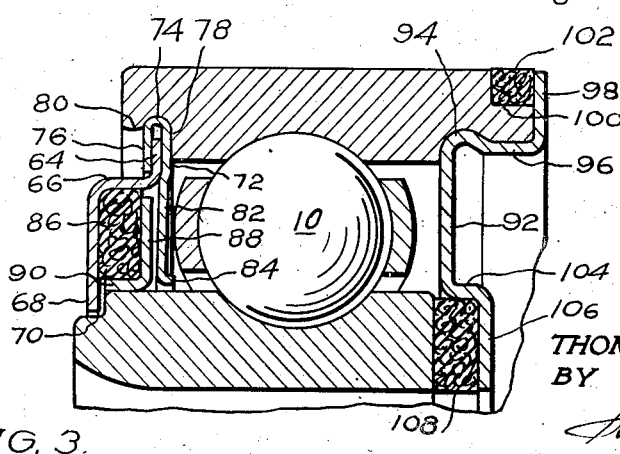
Fig. 3 is a similar view of another modified form.

The bearing of Fig. 3 is capable of similar use but is narrower and more compact. It has improved means to retain bearing lubricant in the bearing, and also seals up both race rings at their seating surfaces. At the left, the space between race rings is closed by a plurality of washers. One washer comprises a peripheral flange 64, an axially extended cupped portion 66, and an inwardly extending wall or flange 68, the latter being extended along a lateral face of the inner race ring to enter a peripheral notch 70 therein.

Another washer is attached to the first and comprises a flat portion 72 engaging the flange 64, a rounded bead 74, and a terminal flap 76. The two washers are locked together by pressing the edge of the flap 76 laterally along the cupped portion 66 against the flange 64, this action also expanding the rounded bead into a groove of the outer race ring, the groove being bounded by a deep shoulder 78 and by a shallow land 80. The washer which abuts against the shoulder 78 also comprises a slightly dished or inclined wall 82 clearing the cage 12 and terminating in a laterally extending bend or flange 84 positioned close to the inner race ring and inclined with respect thereto. Within the cupped portion 66 is contained a packing ring or sealing washer 86, preferably of felt, which runs in the angle of an angle washer comprising a flat leg 88 and a cylindrical leg 90, the latter being pressed on the inner race ring and terminating near the inside wall or lateral face of the notch 70 in clearance relation to the flange 68. The leg 88 and the inclined wall 82 make an angle of about four degrees with one another, an angle of this degree producing capillary attraction tending to hold lubricant between the race rings. The terminal flange 84 is similarly inclined with respect to the race ring for a similar reason.

At the right of Fig. 3, the bearing is not only closed between the race rings but both of such race rings are sealed with respect to their seats. A guard or washer 92 is secured to the outer race ring by rolling or expanding a rounded bead 94 into a groove. Beyond the groove is an axial wall 96 engaging the inner surface of the race ring while a terminal flange 98 extends outwardly along the end face of the race ring. A portion of such flange 98 closes the side of a groove or notch 100 in the outer edge of the race ring and retains a compressible packing ring 102 which will seal the bearing in its seat as in Fig. 2. The washer 92 has an axially extended cupped portion 104 and a terminal flange 106 which form a groove with the inner race ring, the groove retaining a compressible packing ring 108 which is adapted to engage a supporting shaft and seal the inner surface of the race ring thereon.

I claim:

1. In a device of the character described, a bearing having a pair of race rings and rolling elements, a washer carried by one of the race rings and extending towards the other race ring, a washer carried by said other race ring and extending towards said one race ring, one of said washers being close to and inclined at a capillary angle with respect to the other washer for a substantial portion of its length, and one of said washers having a terminal flange extending laterally therefrom and making a capillary angle with the peripheral surface of the adjacent race ring; substantially as described.

2. In a device of the character described, a bearing having a pair of race rings and rolling elements, a closure secured to one of the race rings and comprising inner and outer side walls spaced apart adjacent to the other race ring, the outer side wall being extended into a peripheral notch of said other race ring, a packing washer and an angle washer between said walls, the angle washer having one leg fitting on said other race ring and terminating at the inner side of the peripheral notch; substantially as described.

3. In a device of the character described, a bearing having a pair of race rings and rolling elements, a closure secured to one of the race rings and comprising inner and outer side walls spaced apart adjacent to the other race ring, the outer side wall being extended into a peripheral notch of said other race ring, a packing washer and an angle washer between said walls, the angle washer having one leg fitting on said other race ring and terminating short of the extended wall, and the inner side wall of the closure being inclined at a capillary angle; substantially as described.

4. In a device of the character described, a bearing having a pair of race rings and rolling elements, a closure secured to one of the race rings and comprising inner and outer side walls spaced apart adjacent to the other race ring, the outer side wall being extended into a peripheral notch of said other race ring, a packing washer engaging the outer side wall, and a washer carried by the other race ring in clearance relation to the inner side wall and engaging the packing washer; substantially as described.

5. In a device of the character described, a bearing having a pair of race rings with rolling elements, a closure secured to one of the race rings and comprising inner and outer side walls spaced apart adjacent to the other race ring, the outer side wall being extended along a lateral face of said other race ring, a packing washer engaging the outer side wall, a washer on said other race ring and engaging the packing washer, and said last washer and the inner side wall being relatively inclined; substantially as described.

6. In a device of the character described, a bearing having race rings and rolling elements, one of the race rings having a groove, a washer having a portion in holding engagement with the groove, another portion of the washer being extended beyond the end of said race ring and forming a groove therewith, and a packing in the groove; substantially as described.

7. In a device of the character described, a bearing having race rings and rolling elements, a washer having a portion secured to one of the race rings, another portion of the washer forming a groove with one of the race rings, a packing in the groove, and another portion of the washer being extended close to the other race ring to close the space between the race rings; substantially as described.

8. In a device of the character described, a bearing having race rings and rolling elements, a washer having a portion secured to one of the race rings, another portion of the washer forming a groove with one of the race rings, a packing in the groove, another portion of the washer being extended close to the other race ring, and a washer carried by said other race ring at one side of said extended portion; substantially as described.

9. In a device of the character described, a bearing having race rings and rolling elements, a washer secured to one of the race rings and having a packing holding extension, a packing held by the extension, a portion of the washer being extended close to the other race ring at that end of the bearing having the packing, and a washer carried by said other race ring at one side of and spaced from said extended portion; substantially as described.

10. In a device of the character described, a bearing having race rings and rolling elements, a washer having an axially extended portion in holding engagement with a groove in one of the race rings, the washer having a wall extending close to the other race ring, an angle washer having one leg pressed into said axially extended portion, and another leg of the angle washer extending towards said other race ring, and a washer secured to said other race ring and extending towards said pressed in leg; substantially as described.

11. In a device of the character described, a bearing having race rings and rolling elements, a washer secured to one of the race rings, a portion of the washer forming a groove with one of the race rings, another portion of the washer forming a groove with the other race ring, and a packing in each of the grooves; substantially as described.

12. In a device of the character described, a bearing having inner and outer race rings and rolling elements, means carried by the bearing to seal the outer race ring in a bearing seat, and means carried by the bearing and engaging the inner race ring at one end of the bore thereof to seal bore of the inner race ring with respect to a supporting shaft; substantially as described.

13. In a device of the character described, a bearing having inner and outer race rings and rolling elements, a packing ring at the outer periphery of the outer race ring to seal such race ring in a bearing seat, and a packing ring at the inner periphery of the inner race ring and engaging said inner race ring at one end thereof to seal the bore of the inner race ring with respect to a supporting shaft; substantially as described.

14. In a device of the character described, a bearing comprising inner and outer race rings and rolling elements, sealing means for closing up the ends of the bearing, packing means at the outer periphery of the outer race ring, packing means at the inner periphery of the inner race ring, and means carried by the sealing means for holding the two packing means in position; substantially as described.

15. In a device of the character described, a bearing having a pair of race rings and rolling elements, a closure secured to one of the race rings and comprising inner and outer side walls spaced apart adjacent to the other race ring, a washer secured to said other race ring and extending between said inner and outer side walls and in clearance relation to one of them, and a yieldable packing between the washer and the remaining side wall; substantially as described.

THOMAS C. DELAVAL-CROW.